(12) United States Patent
Rauser

(10) Patent No.: US 7,383,098 B2
(45) Date of Patent: Jun. 3, 2008

(54) MACHINE TOOL ACCELERATION

(75) Inventor: Thomas Rauser, Siundelfingen (DE)

(73) Assignee: Trumpf, Inc., Farmington, CT (US)

( * ) Notice: Subject to any disclaimer, the term of this patent is extended or adjusted under 35 U.S.C. 154(b) by 604 days.

(21) Appl. No.: 10/882,285

(22) Filed: Jul. 2, 2004

(65) Prior Publication Data

US 2006/0004480 A1    Jan. 5, 2006

(51) Int. Cl.
*G06F 19/00*    (2006.01)

(52) U.S. Cl. ............... 700/188; 700/186; 700/193; 700/162; 700/166

(58) Field of Classification Search ........... 700/188, 700/189, 190, 191, 192, 63, 153, 186, 193, 700/162, 166; 219/121.11
See application file for complete search history.

(56) References Cited

U.S. PATENT DOCUMENTS 4,916,636 A * 4/1990 Torii et al. ............... 700/245
6,294,755 B1 * 9/2001 Sawatzky et al. ......... 219/121.72
2001/0021881 A1 * 9/2001 Iriguchi et al. ............ 700/160

FOREIGN PATENT DOCUMENTS

EP    02 405 70    10/1987
JP    081 23531    5/1996

OTHER PUBLICATIONS

International Search Report (3 pages), Aug. 24, 2005.

* cited by examiner

*Primary Examiner*—Paul Rodriguez
*Assistant Examiner*—Nate Laughlin
(74) *Attorney, Agent, or Firm*—Fish & Richardson P.C.

(57) ABSTRACT

A method of controlling the movement of a processing head of a machine tool includes monitoring the position of the processing head along a first coordinate direction, monitoring the movement of the processing head along a second coordinate direction different from the first coordinate direction, and limiting the acceleration or the change in acceleration of the processing head along the second coordinate direction to a value below a predetermined maximum value, wherein the predetermined maximum value depends on the position of the processing head along the first coordinate direction.

50 Claims, 6 Drawing Sheets

MACHINE TOOL ACCELERATION

TECHNICAL FIELD

This invention relates to machine tools, and more particularly to a machine tool with acceleration control.

BACKGROUND

The processing head of a machine tool often moves in two or three dimensions during operation. The acceleration and acceleration changes of a processing head are critical factors in the dynamic operation of a machine tool and can significantly influence the productivity of the machine tool. At the same time, the dynamics of the processing head have a significant influence on the productivity of the machine tool. The acceleration and acceleration changes of the processing head are conventionally adjusted in correspondence with the machine structure, amount of load on the processing head, characteristics of the motor driving the motion of the processing head, the curve followed by the processing head, and the process technology. However, the positioning accuracy of the processing head relative to one coordinate often depends on its position relative to another orthogonal coordinate.

SUMMARY

Methods and apparatus are disclosed for operating a machine tool with a processing head. The acceleration of the processing head of the machine tool is controlled to reduce the deleterious effects of dynamic forces on the positioning accuracy of the processing head.

In a first general aspect, methods of controlling movement of a processing head of a machine tool include monitoring a position of the processing head along a first coordinate direction, monitoring the movement of the processing head along a second coordinate direction different from the first coordinate direction, and limiting an acceleration of the processing head along the second coordinate direction to a value below a predetermined maximum value, where the predetermined maximum value decreases as a function of the position of the processing head along the first coordinate direction.

In another embodiment, methods of controlling movement of a processing head of a machine tool include monitoring a position of the processing head along a first coordinate direction, monitoring the movement of the processing head along a second coordinate direction different from the first coordinate direction, and limiting a change in acceleration of the processing head along the second coordinate direction to a value below a predetermined maximum value, where the predetermined maximum value decreases as a function of the position of the processing head along the first coordinate direction.

In another aspect, a computer program product, tangibly stored on a machine-readable medium, for controlling the movement of a processing head of a machine tool, includes instructions for causing a processor to receive information about a position of the processing head along a first coordinate direction; receive information about movement of the processing head along a second coordinate direction that is different from the first coordinate direction, and limit the acceleration of the processing-head along the second coordinate direction to a value below a predetermined maximum value, wherein the predetermined maximum value decreases as a function of the position of the processing head along the first coordinate direction.

In another embodiment, a computer program product, tangibly stored on a machine readable medium, for controlling the movement of a processing head of a machine tool, includes instructions for causing a processor to receive information about a position of the processing head along a first coordinate direction; receive information about movement of the processing head along a second coordinate direction that is different from the first coordinate direction, and limit a change in an acceleration of the processing head along the second coordinate direction to a value below a predetermined maximum value, wherein the predetermined maximum value decreases as a function of the position of the processing head along the first coordinate direction.

The methods and the computer program products can include one or more of the following features. For example, a positioning accuracy of the processing head in the second coordinate direction can depend on the head's position in the first coordinate direction an on the head's acceleration and/or change in acceleration in the second coordinate direction. The predetermined maximum value can decrease continuously as the distance of the processing head increases along the first coordinate direction. The predetermined maximum value can have different discrete values for different discrete ranges of positions in the first coordinate direction of the processing head, and lengths of the ranges of positions along the first coordinate direction can decrease monotonically along the first coordinate position.

In another general aspect, a machine tool includes a processing head that is displaceable along a first coordinate direction and along a second coordinate direction that is different from the first coordinate direction, a sensor adapted to monitor the position of the processing head along the first coordinate direction, a memory adapted to store data for determining a maximum allowable value for an acceleration of the processing head in the second coordinate direction, and a processor adapted to limit the acceleration of the processing head in the second coordinate direction to a value lower than a maximum allowable value, wherein the maximum allowable value is determined from the data stored in the memory and from the position of the processing head along the first coordinate direction, and wherein the maximum allowable value decreases as a function of the position of the processing head along the first coordinate direction.

In another embodiment, a machine tool includes a processing head that is displaceable along a first coordinate direction and along a second coordinate direction that is different from the first coordinate direction, a sensor adapted to monitor the position of the processing head along the first coordinate direction, a memory adapted to store data for determining a maximum allowable value for a change in an acceleration of the processing head in the second coordinate direction, and a processor adapted to limit the change in the acceleration of the processing head in the second coordinate direction to a value lower than a maximum allowable value, wherein the maximum allowable value is determined from the data stored in the memory and from the position of the processing head along the first coordinate direction, and wherein the maximum allowable value decreases as a function of the position of the processing head along the first coordinate direction.

The machine tool can include one or more of the following features. For example, a positioning accuracy of the processing head in the second coordinate direction can depend on the head's position in the first coordinate direction an on the head's acceleration and/or change in acceleration in the second coordinate direction. The memory can be adapted for storing a list of maximum allowable values for the acceleration and/or the change in acceleration. The maximum allowable value of the acceleration and/or the change in acceleration can decrease continuously as the distance of the processing head increases along the first coordinate direction. The processing head of the machine tool can be displaceable in a working area, where the working area is divided along the first coordinate direction into a plurality of zones and where a maximum allowable value for the acceleration and/or the change in acceleration of the processing head in the second coordinate direction is associated with each zone. The lengths of at least three consecutive zones in the first coordinate direction can decrease as the distance of the processing head from an origin position increases along the first coordinate direction. The machine tool can further include an arm that is adapted for displacement in the second coordinate direction and upon which the processing head can be guided in the first coordinate direction. The machine tool can further include a beam that is adapted for displacement in the second coordinate direction and upon which the processing head can be guided in the first coordinate direction, where the beam is supported at both ends of the beam, and the beam is displaceably guided along the second coordinate direction. The machine tool can further include a scissor-type drive upon which the processing head is mounted and which is adapted to displace the processing head along the first and second coordinate directions. The processing head can be displaceable along at least three coordinates.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description, and from the claims.

DESCRIPTION OF DRAWINGS

Like reference symbols in the various drawings indicate like elements.

DETAILED DESCRIPTION

Figure 1A:
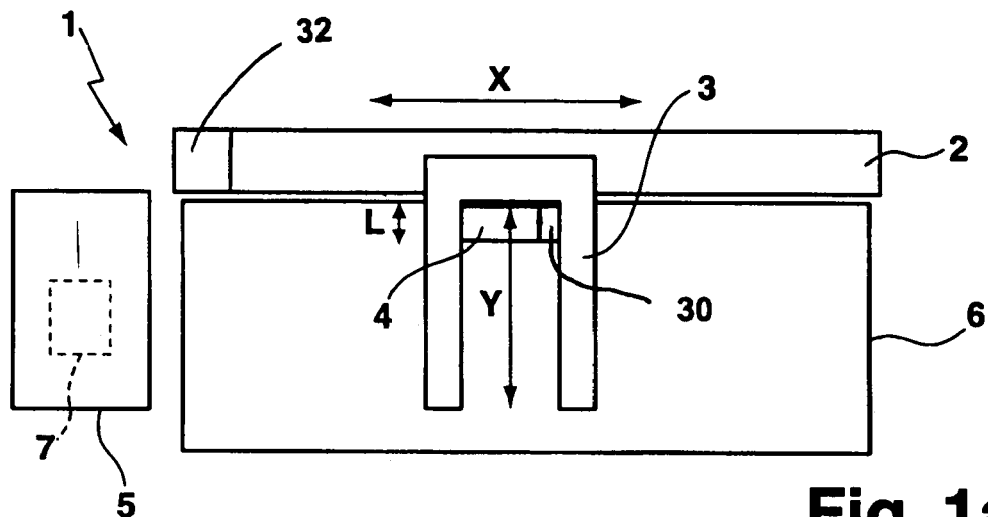
FIG. 1a is a schematic top view of a machine tool with a processing head in a first position along a cantilever.

FIG. 1 shows a machine tool 1 that includes a cantilever arm 3 supported at one end by a guide rail 2 and that extends perpendicularly from the guide rail 2 over a work area 6. The cantilever arm 3 can be displaced by a drive motor 32 along the guide rail 2 in the direction of the x-axis or x-coordinate. A processing head 4 (e.g., a laser cutting head of a laser-cutting machine or a processing tool of a machine tool) is supported by the cantilever arm 3 and can be moved by a drive motor 32 along the cantilever arm 3 in the direction of the y-axis or y-coordinate. The drive motors that move the cantilever arm 3 in the x-direction and move the processing head 4 along the cantilever arm 3 in the y-direction can be different motors or can be the same motor that is geared to move the processing head in different directions. The position of the processing head 4 along the cantilever arm 3 in the y-direction can be monitored directly by a sensor 32. Alternatively, the y-position of the head 4 can be monitored indirectly by the sensor 32. For example, the sensor 32 can monitor the position of a gear, cable, piston, or other means whose position corresponds to the y-position of the head 4, or the sensor can monitor an electrical, optical or other signal that corresponds to the y-position of the head 4. Thus, sensor 32 can monitor the position of the processing head 4, either directly or indirectly. A control unit 5 can be connected to the drive motor(s) to control the motion of the cantilever arm 3 and the processing head 4 and to locate the processing head 4 in a desired x-y position above the work area 6.

The control unit 5 can be, for example, a computer or a digital or analog processor that receives instructions and data from, for example, a memory (e.g., a read-only memory and/or a random access memory), a keyboard, a touch screen, or a wired or wireless network. For brevity, the control unit 5 is represented as a monolithic entity. However, as would be understood by one skilled in the art, the control unit may include numerous interconnected computers, processors, and components designed to perform a set of specified operations. The control unit 5 can be connected to the drive motor(s) by a data pathway capable of delivering signals for controlling the drive motor(s).

A main criterion of the processing quality of the machine tool 1 is the positioning accuracy of the processing head 4 under dynamic forces. When a dynamic force acts on the cantilever arm 3 in a direction perpendicular to the length of the arm 3, the positioning accuracy of the arm in the perpendicular direction can be compromised. For example, when a force acts on the arm 3 in the x-direction due to acceleration of the arm 3 in the x-direction, ax, or due to a change of acceleration in the x-direction, jx, the positioning accuracy of the processing head 4 in the x-direction can depend on the y-position of the processing head 4.

Figure 1B:
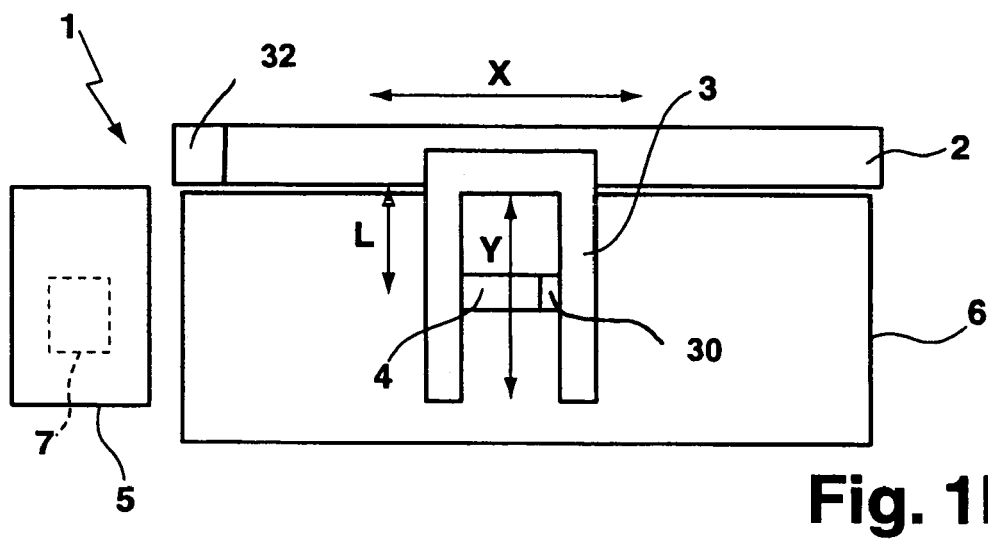
FIG. 1b is a schematic top view of a machine tool with a processing head in a second position along a cantilever.
Figure 1C:
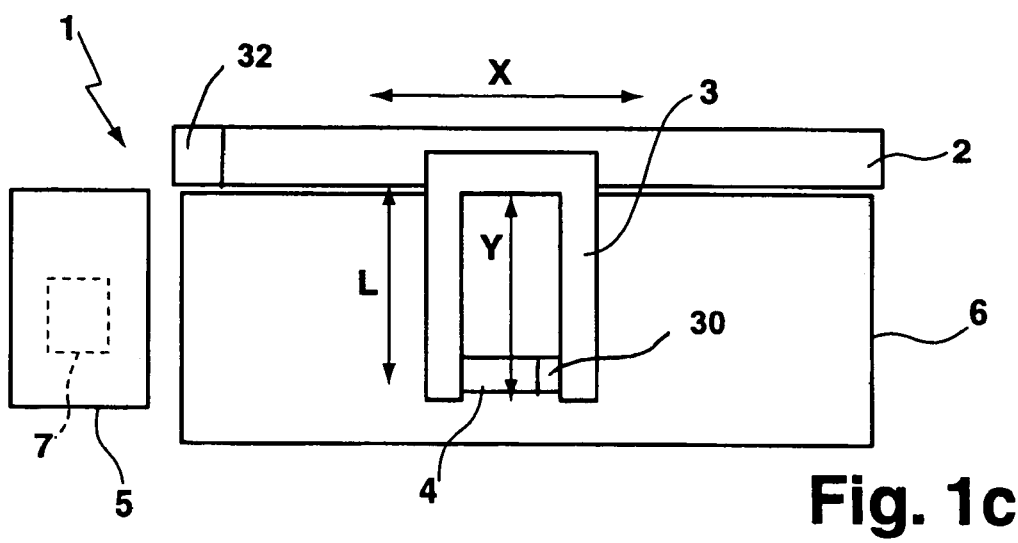
FIG. 1c is a schematic top view of a machine tool with a processing head in a third position along a cantilever.

FIGS. 1a, 1b, and 1c show the distance, L, of the processing head 4 from the guide rail 2 along the cantilever 3 at a minimum, intermediate, and maximum distance, respectively. The larger the distance L of the processing head 4 from the guide rail 2, the smaller is the positioning accuracy in the x-direction of the processing head 4 under dynamic forces. Thus, the same acceleration of the cantilever arm 3 in the x-direction results in a greater positioning error when the processing head 4 is farther away from the guide rail 2 (as shown in FIG. 1c) than when the processing head 4 is closer to the guide rail 2 (as shown in FIG. 1a).

To reduce the dependence of the positioning accuracy of the processing head 4 in the x-direction on its position along the cantilever arm 3 in the y-direction, the dynamic force on the processing head 4 in a direction perpendicular to the cantilever arm 3 can be varied by continuously controlling the maximum possible acceleration and acceleration change of the cantilever arm 3 in the perpendicular direction as a function of the processing head's distance from the guide rail 2. Thus, for example, the acceleration of the processing head 4 in the x-direction, ax, and its change of acceleration, jx, are each limited to maximum values $ax_{max}$, $jx_{max}$, that depend on the y-position of the processing head 4. For the machine tool 1 shown in FIG. 1, the maximum allowable values, $ax_{max}$, $jx_{max}$, for the acceleration of the processing head 4 and the processing head's change of acceleration in the x-direction are controlled such that they decrease with increasing distance, y, between the processing head 4 and the guide rail 2 of the cantilever arm 3.

These maximum values of $ax_{max}$ and $jx_{max}$ applied to the cantilever arm 3 are controlled by the control unit 5 and/or a control program that controls the control unit 5. Thus, the maximum allowable values, $ax_{max}(y)$ and $jx_{max}(y)$, as functions of the y-position of the processing head 4, can be stored in hardware or software or can be calculated (e.g., as functions of the y-position of the processing head 4, i.e., $ax_{max}=f(y)$ and $jx_{max}=f(y)$). The control unit 5 includes a processing routine 7 that is implemented in hardware or software and that correspondingly limits the acceleration, ax, and acceleration change, jx, of the cantilever 3. The characteristic acceleration and acceleration change values imposed by the processing routine 7 can be implemented as a continuous, steady function or as a step function.

Figure 2A:
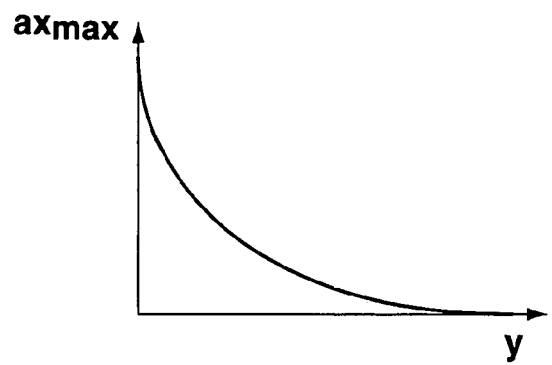
FIG. 2a is a plot of the dependence of a maximum allowable acceleration in the x-direction for a processing head as a function of the y-position of the processing head.
Figure 2B:
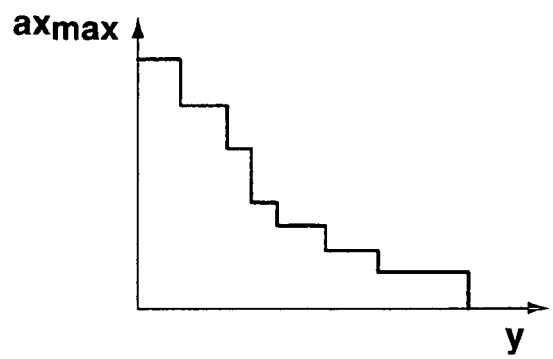
FIG. 2b is a plot of the dependence of a maximum allowable acceleration in the x-direction for a processing head as a function of the y-position of the processing head.

In case of a continuous steady function (as shown in FIG. 2a), the maximum values $ax_{max}(y)$ are continuously adjusted in dependence on the y-position of the processing head 4. For a discontinuous function (as shown in FIG. 2b), the working area 6 of the processing head 4 is divided into N acceleration zones along the y-coordinate, and a single maximum value for the x acceleration, $ax^i_{max}$, is associated with each individual zone, where i is an index value that ranges from 1 to N.

Figure 3:
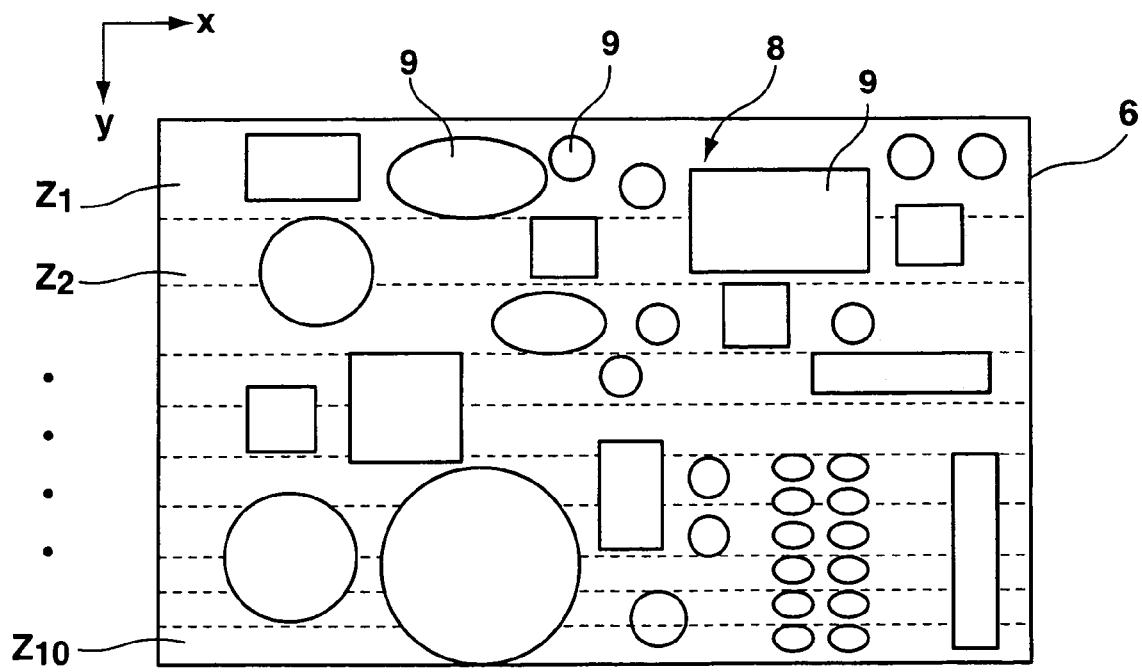
FIG. 3 is a schematic diagram of an area in which the processing head is used.

FIG. 3 shows a simplified metal sheet 8 that includes a number of work pieces 9 having different contours that are to be cut from a metal sheet 8. The working area 6 corresponding to the metal sheet 8 is divided along the y-coordinate into ten acceleration zones, z1, z2, . . . z10, to each of which a different maximum value $ax^i_{max}$ is associated. The y-lengths of the ten acceleration zones z1 to z10 can be identical or can vary. For example, the y-lengths of the acceleration zones can decrease in steps in the y-direction, i.e., with increasing distance y from the guide rail 2. As the processing head 4 moves over the different acceleration zones, z1, z2, . . . z10, of the metal sheet to cut out the contours of each work piece 9, the dynamics of the processing head 4 for each line, curve, or contour of the work pieces 9 are limited in accordance with the maximum allowable acceleration and acceleration changes in the x-direction for the respective acceleration zone in which the line or contour exists. If the line, curve, or contour extends over several acceleration zones, $Z_m$ and $Z_n$, two strategies are possible. The dynamics of the processing head 4 can be limited according to the zone with the smaller maximum value for acceleration, or the line, curve or contour can be divided into individual segments that lie either in $Z_m$ or $Z_n$, and the corresponding maximum acceleration value is limited for each segment according to the maximum allowable acceleration for each zone, $ax^m_{max}$ and $ax^n_{max}$.

Figure 4:
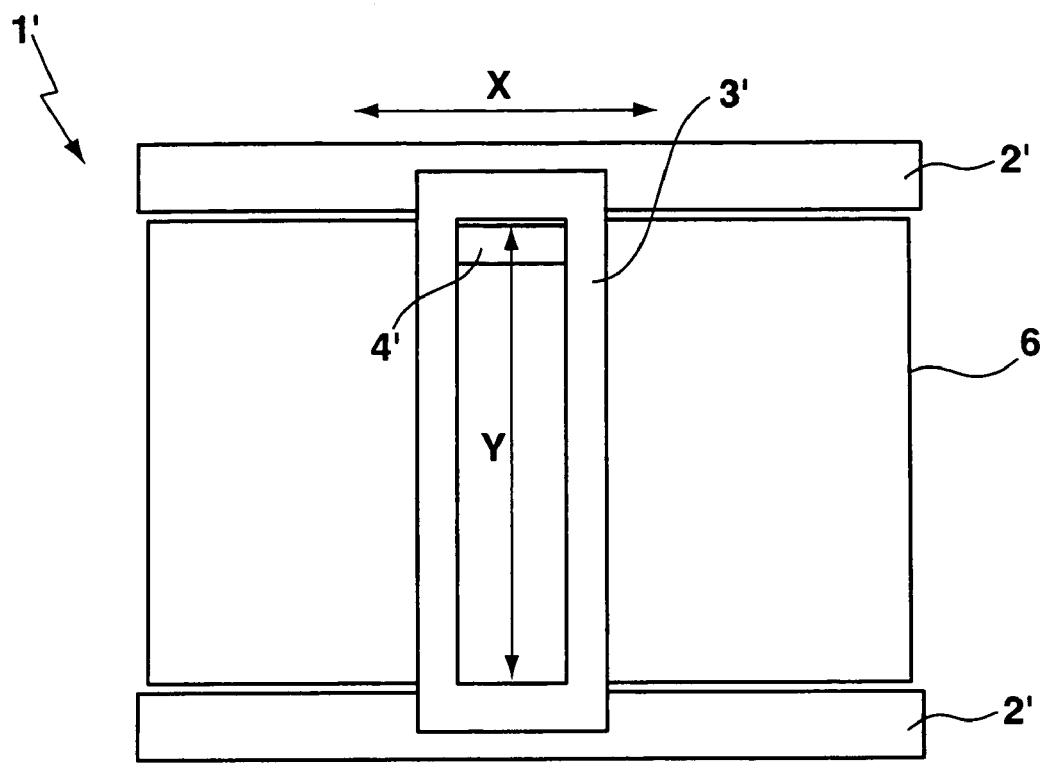
FIG. 4 is a schematic top view of a machine tool with a processing head supported on a portal that slides along two rails.
Figure 5:
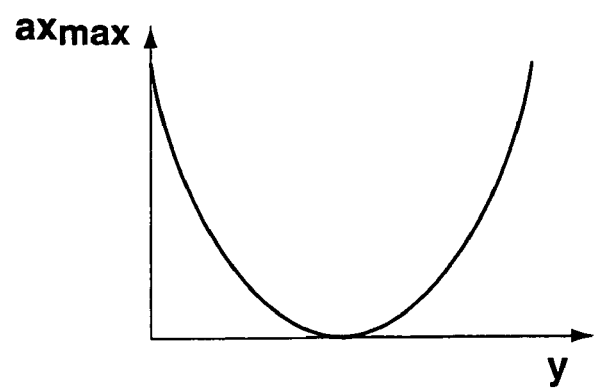
FIG. 5 is a plot of the dependence of a maximum allowable acceleration in the x-direction for a processing head as a function of the y-position of the processing head.

FIG. 4 shows a machine tool 1' that includes a beam 3' guided at both of its ends by guide rails 2' along the x-coordinate. A processing head 4' is guided on the beam 3' along the y-coordinate. In this case, the maximum values $ax_{max}$ and $jx_{max}$ for the x-acceleration of the processing head 4' and its change of acceleration decrease as the processing head 4' moves from one end of the beam 3' towards the center of the beam 3', and then increases as the head 4 moves from the center of the beam 3' to the other end of the beam 3', as shown by the graph in FIG. 5. In other words, the maximum values $ax_{max}$ and $jx_{max}$ decrease as the head 4 moves along the y-coordinate from one end of the beam 3' towards the center of the beam 3'.

Figure 6A:
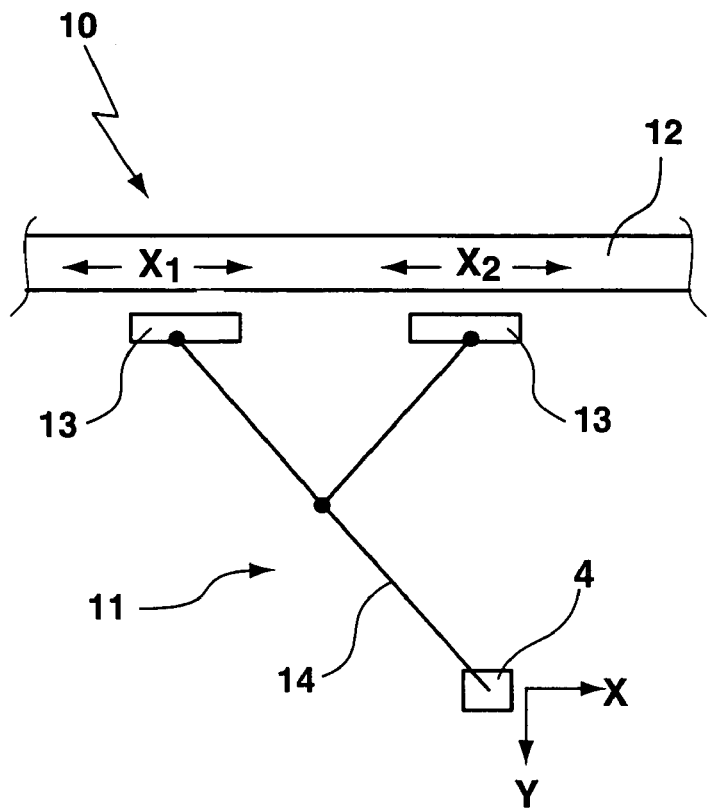
FIG. 6a is a schematic top view of a machine tool with a processing head supported by a scissor drive.
Figure 6B:
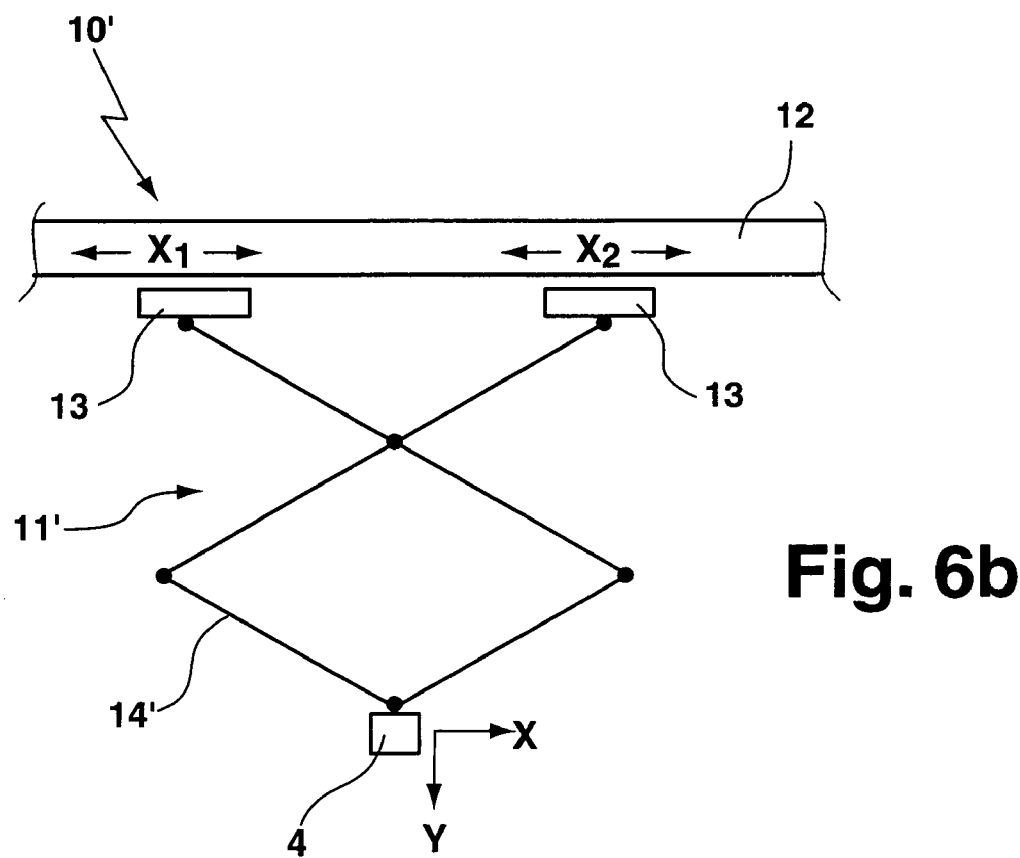
FIG. 6b is a schematic top view of a machine tool with a processing head supported by a scissor drive.

FIG. 6a shows a machine tool 10 with a one-sided scissor-type drive 11, and FIG. 6b shows a machine tool 10' with a two-sided scissor-type drive 11' for displacing the processing head 4 along the x- and y-coordinates. The scissor-type drives 11, 11', have two guiding elements 13 that can be displaced along the x-coordinate on a guide rail 12. Changes in the distance between guiding elements 13 cause extension of the scissor elements 14, 14' and displacement of the processing head 4 along the y-coordinate. Displacement of the scissor elements 14, 14' along the guide rail 12 causes displacement of the processing head 4 in the x-direction. Thus, the x-y motion of the processing head 4 can be controlled. The positioning accuracy of the processing head 4 under dynamic forces depends on the distance between the processing head 4 and the guide rail 12, i.e., on the x distance between the guiding elements 13. In this case, because the distance of the processing head 4 from the guide rail 12 depends on the distance between the guiding elements 13, the maximum values $ax_{max}$, $jx_{max}$, for the acceleration ax and acceleration change jx of the processing head 4, i.e., the acceleration characteristic, are delimited as functions of the distance, $x_1-x_2$, between the two guiding elements 13, i.e., $ax_{max}=f_1(x_1-x_2)$ and $jx_{max}=f_2(x_1-x_2)$.

Figure 7:
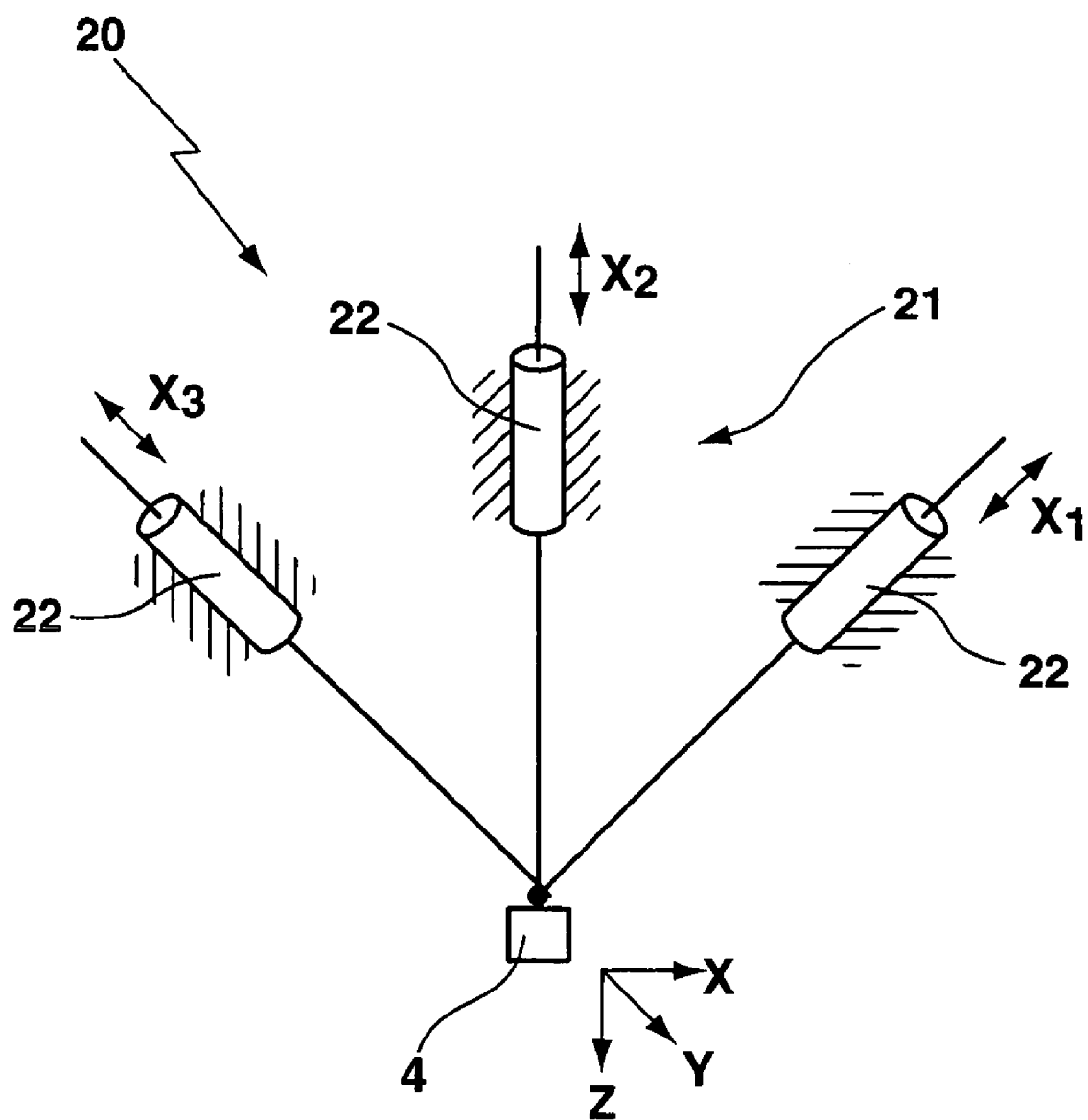
FIG. 7 is a schematic top view of a machine tool with a processing head supported by three rod drives.

FIG. 7 shows a machine tool 20 with a rod drive 21 for moving the processing head 4 along the x, y, and z coordinates. The rod drive 21 has three linearly displaceable rod elements 22 through which the spatial motion of the processing head 4 can be controlled. The spatial positioning accuracy of the processing head 4 depends on how far the rod elements 22 are extended along the x1, x2, and x3 coordinates. In this case, the maximum values $ax_{max}$, $jx_{max}$, $ay_{max}$, $jy_{max}$, $az_{max}$, $jz_{max}$ for the acceleration ax, ay, az of the processing head 4 are limited along the x, y, and z coordinates and their changes jx, jy, jz, i.e., the acceleration characteristic, as functions of the positions of the rod elements 22, i.e.:

$$ax_{max}=f(x_1,x_2,x_3) \text{ and } jx_{max}=f(x_1,x_2,x_3)$$

$$ay_{max}=f(x_1,x_2,x_3) \text{ and } jy_{max}=f(x_1,x_2,x_3)$$

$$az_{max}=f(x_1,x_2,x_3) \text{ and } jz_{max}=f(x_1,x_2,x_3)$$

In a variation, the processing head 4 is mounted on a robot arm that can extend the processing head 4 away from the body of the robot. The spatial positioning accuracy of the robot-arm-mounted processing head 4 depends on the distance between the processing head and the base of the robot arm. Therefore, the possible accelerations of the processing head and their changes are limited to values that decrease with increasing distance between the processing head and the base of the robot arm.

The method for limiting acceleration in dependence on the position of the processing head 4 can be implemented as a control program that runs in the control unit 5 of the machine tool or it can be directly implemented directly in the control unit 5.

Figure 8:
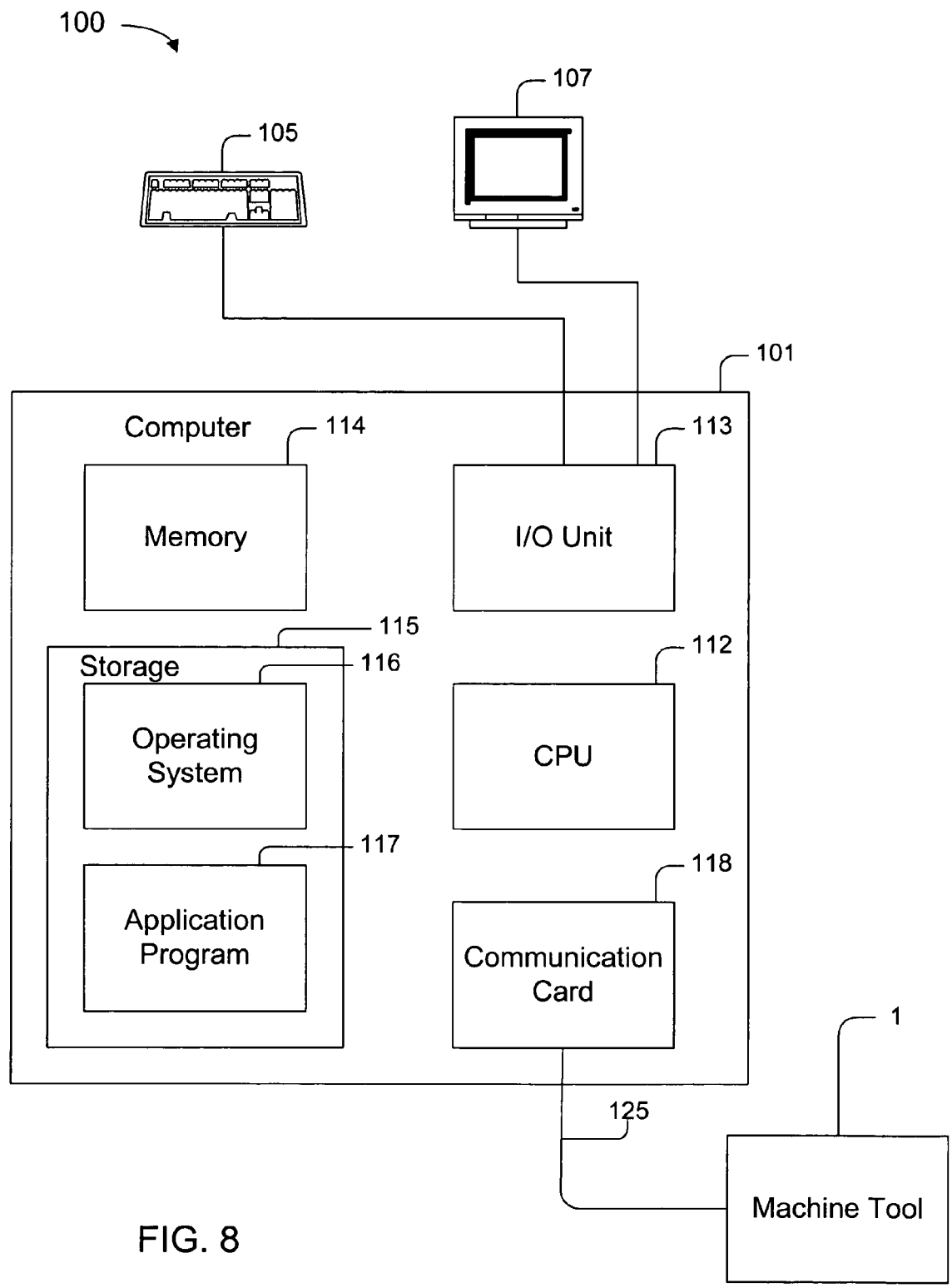
FIG. 8 is a schematic diagram of a system for controlling the acceleration of a processing head of a machine tool.

As shown in FIG. 8, exemplary components of a system 100 that can be used to control the acceleration of a processing head 4 of a machine tool include various input/output (I/O) devices (e.g., keyboard 105 and display 107) and a computer 101 having a central processor unit (CPU) 112, an I/O unit 113, a memory 114, and a storage device 115. Storage device 115 may store machine-executable instructions, data, and various programs, such as an operating system 116 and one or more application programs 117, all of which may be processed by CPU 112. Each computer application may be implemented in a high-level procedural or object-oriented programming language, or in assembly or machine language if desired. The language may be a compiled or interpreted language. Data storage device 115 may be any form of non-volatile memory, including, for example, semiconductor memory devices, such as Erasable Programable Read-Only Memory (EPROM), Electrically Erasable Programable Read-Only Memory (EEPROM), and flash memory devices; magnetic disks such as internal hard disks and removable disks; magneto-optical disks; and Compact Disc Read-Only Memory (CD-ROM).

Computer 101 may also include a communications card or device 118 for exchanging data with machine tool 1 through a communications link 125. Other examples of system 100 include a handheld device, a workstation, a server, a device, a component, other equipment, or some combination thereof, capable of responding to and executing instructions in a defined manner. Any of the foregoing may be supplemented by, or incorporated in, application-specific integrated circuits (ASICs). Memory may be any form of memory, including, for example, main random access memory ("RAM").

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method of controlling movement of a processing head of a machine tool, the method comprising:
monitoring a position of the processing head along a first coordinate direction;
monitoring movement of the processing head along a second coordinate direction different from the first coordinate direction; and
limiting an acceleration of the processing head along the second coordinate direction to a value below a predetermined maximum value, wherein the predetermined maximum value decreases as a non-linear function of the position of the processing head along the first coordinate direction.

2. The method of claim 1, wherein a positioning accuracy of the processing head in the second coordinate direction depends on the head's position in the first coordinate direction and depends on the head's acceleration in the second coordinate direction.

3. The method according to claim 1, wherein the predetermined maximum value decreases continuously as a distance of the processing head increases along the first coordinate direction.

4. The method of claim 1, wherein the predetermined maximum value has different discrete values for different discrete ranges of positions in the first coordinate direction of the processing head.

5. The method of claim 4, wherein lengths of the ranges of positions along the first coordinate direction decrease monotonically along the first coordinate position.

6. A method of controlling movement of a processing head of a machine tool, the method comprising:
monitoring a position of the processing head along a first coordinate direction;
monitoring movement of the processing head along a second coordinate direction different from the first coordinate direction; and
limiting the change in acceleration of the processing head along the second coordinate direction to a value below a predetermined maximum value, wherein the predetermined maximum value decreases as a function of the position of the processing head along the first coordinate direction.

7. The method of claim 6, wherein a positioning accuracy of the processing head in the second coordinate direction depends on the head's position in the first coordinate direction and depends on the head's change in acceleration in the second coordinate direction.

8. The method according to claim 6, wherein the predetermined maximum value decreases continuously as the distance of the processing head increases along the first coordinate direction.

9. The method of claim 6, wherein the predetermined maximum value has different discrete values for different discrete ranges of positions in the first coordinate direction of the processing head.

10. The method of claim 9, wherein the lengths of the ranges of positions along the first coordinate direction decrease monotonically along the first coordinate position.

11. A machine tool comprising:
a processing head that is displaceable along a first coordinate direction and along a second coordinate direction that is different from the first coordinate direction;
a sensor adapted to monitor the position of the processing head along the first coordinate direction;
a memory adapted to store data for defining a maximum allowable value of an acceleration of the processing head in the second coordinate direction; and
a processor adapted to limit the acceleration of the processing head in the second coordinate direction to a value lower than a maximum allowable value, wherein the maximum allowable value is determined from the data stored in the memory and from the position of the processing head along the first coordinate direction, and wherein the maximum allowable value decreases as a non-linear function of the position of the processing head along the first coordinate direction.

12. The machine tool of claim 11, wherein a positioning accuracy of the processing head in the second coordinate direction depends on the head's position in the first coordinate direction and depends on the head's acceleration in the second coordinate direction.

13. The machine tool of claim 11, wherein the memory is adapted for storing a list of maximum allowable values for the acceleration.

14. The machine tool of claim 11, wherein the maximum allowable value of the acceleration decreases continuously as a distance of the processing head increases along the first coordinate direction.

15. The machine tool of claim 11, wherein the processing head is displaceable in a working area, and wherein the working area is divided along the first coordinate direction into a plurality of zones and wherein a maximum allowable value for the acceleration of the processing head in the second coordinate direction is associated with each zone.

16. The machine tool of claim 15, wherein lengths of at least three consecutive zones in the first coordinate direction decrease as the distance of the processing head increases along the first coordinate direction.

17. The machine tool of claim 11, further comprising an arm that is adapted for displacement in the second coordinate direction and upon which the processing head can be guided in the first coordinate direction.

18. The machine tool of claim 11, further comprising a beam that is adapted for displacement in the second coordinate direction and upon which the processing head can be guided in the first coordinate direction, wherein the beam is supported at both ends of the beam, and the beam is displaceably guided along the second coordinate direction.

19. The machine tool of claim 11, further comprising a scissor-type drive upon which the processing head is mounted and which is adapted to displace the processing head along the first and second coordinate directions.

20. The machine tool of claim 11, wherein the processing head is displaceable along at least three coordinates.

21. A machine tool comprising:
a processing head that is displaceable along a first coordinate direction and along a second coordinate direction that is different from the first coordinate direction;
a sensor adapted to monitor the position of the processing head along the first coordinate direction;
a memory adapted to store data for defining a maximum allowable value of a change in acceleration of the processing head in the second coordinate direction; and
a processor adapted to limit the change in acceleration of the processing head in the second coordinate direction to a value lower than a maximum allowable value, wherein the maximum allowable value is determined from the data stored in the memory and from the position of the processing head along the first coordinate direction, and wherein the maximum allowable value decreases as a function of the position of the processing head along the first coordinate direction.

22. The machine tool of claim 21, wherein a positioning accuracy of the processing head in the second coordinate direction depends on the head's position in the first coordinate direction and depends on the head's change in acceleration in the second coordinate direction.

23. The machine tool of claim 21, wherein the memory is adapted for storing a list of maximum allowable values for the change in acceleration.

24. The machine tool of claim 21, wherein the maximum allowable value of the change in acceleration decreases continuously as a distance of the processing head increases along the first coordinate direction.

25. The machine tool of claim 21, wherein the processing head is displaceable in a working area, and wherein the working area is divided along the first coordinate direction into a plurality of zones and wherein a maximum allowable value for the change in acceleration of the processing head in the second coordinate direction is associated with each zone.

26. The machine tool of claim 25, wherein lengths of at least three consecutive zones in the first coordinate direction decrease as the distance of the processing head increases along the first coordinate direction.

27. The machine tool of claim 21, further comprising an arm that is adapted for displacement in the second coordinate direction and upon which the processing head can be guided in the first coordinate direction.

28. The machine tool of claim 21, further comprising a beam that is adapted for displacement in the second coordinate direction and upon which the processing head can be guided in the first coordinate direction, wherein the beam is supported at both ends of the beam, and the beam is displaceably guided along the second coordinate direction.

29. The machine tool of claim 21, further comprising a scissor-type drive upon which the processing head is mounted and which is adapted to displace the processing head along the first and second coordinate directions.

30. The machine tool of claim 21, wherein the processing head is displaceable along at least three coordinates.

31. A computer program product, tangibly stored on a machine-readable medium, for controlling the movement of a processing head of a machine tool, the computer program product comprising instructions for causing a processor to:
receive information about a position of the processing head along a first coordinate direction;
receive information about movement of the processing head along a second coordinate direction that is different from the first coordinate direction; and
limit an acceleration of the processing head along the second coordinate direction to a value below a predetermined maximum value, wherein the predetermined maximum value decreases as a non-linear function of the position of the processing head along the first coordinate direction.

32. The computer program product of claim 31, wherein the predetermined maximum value decreases continuously as the position of the processing head increases along the first coordinate direction.

33. The computer program product of claim 31, wherein the predetermined maximum value has different discrete values for different discrete ranges of positions in the first coordinate direction of the processing head.

34. The computer program product of claim 33, wherein the lengths of the ranges of positions along the first coordinate direction decrease monotonically along the first coordinate position.

35. A computer program product, tangibly stored on a machine readable medium, for controlling the movement of a processing head of a machine tool, the computer program product comprising instructions for causing a processor to:
receive information about a position of the processing head along a first coordinate direction;
receive information about movement of the processing head along a second coordinate direction that is different from the first coordinate direction; and
limit a change in acceleration of the processing head along the second coordinate direction to a value below a predetermined maximum value, wherein the predetermined maximum value decreases as a function of the position of the processing head along the first coordinate direction.

36. The computer program product of claim 35, wherein the predetermined maximum value decreases continuously as the position of the processing head increases along the first coordinate direction.

37. The computer program product of claim 35, wherein the predetermined maximum value has different discrete values for different discrete ranges of positions in the first coordinate direction of the processing head.

38. The computer program product of claim 37, wherein the lengths of the ranges of positions along the first coordinate direction decrease monotonically along the first coordinate position.

39. The method of claim 1, wherein the first and second coordinate directions are Cartesian coordinate directions.

40. The method of claim 1, wherein the predetermined maximum value decreases for positions of the processing head that are less than a center value along the first coordinate direction.

41. The method of claim 40, wherein the predetermined maximum value increases for positions of the processing head that are greater than the center value along the first coordinate direction.

42. The method of claim 6, wherein the first and second coordinate directions are Cartesian coordinate directions.

43. The machine tool of claim 11, wherein the first and second coordinate directions are Cartesian coordinate directions.

44. The machine tool of claim 11, wherein the maximum allowable value decreases for positions of the processing head that are less than a center value along the first coordinate direction.

45. The machine tool of claim 44, wherein the maximum allowable value increases for positions of the processing head that are greater than the center value along the first coordinate direction.

46. The machine tool of claim 21, wherein the first and second coordinate directions are Cartesian coordinate directions.

47. The computer program product of claim 31, wherein the first and second coordinate directions are Cartesian coordinate directions.

48. The computer program product of claim 31, wherein the predetermined maximum value decreases for positions of the processing head that are less than a center value along the first coordinate direction.

49. The computer program product of claim 48, wherein the predetermined maximum value increases for positions of the processing head that are greater than the center value along the first coordinate direction.

50. The computer program product of claim 35, wherein the first and second coordinate directions are Cartesian coordinate directions.

* * * * *